May 19, 1936. W. A. McLEAN 2,041,198
FLUID PRESSURE REGULATING VALVE
Filed Aug. 23, 1935
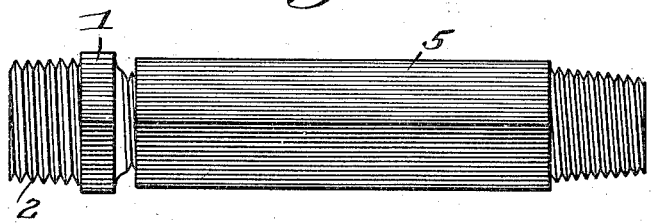
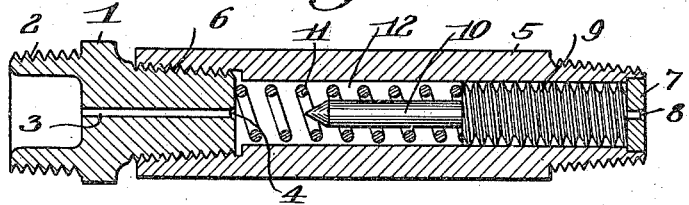
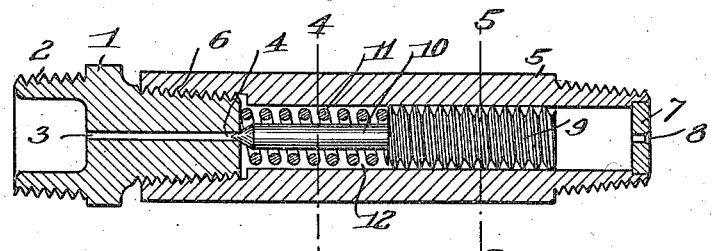
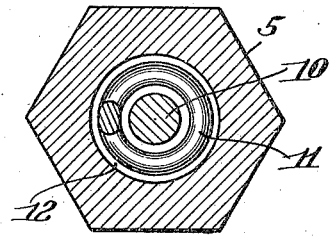 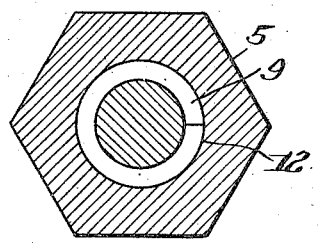
INVENTOR
William A. McLean
BY
his ATTORNEY Patented May 19, 1936

2,041,198

UNITED STATES PATENT OFFICE 2,041,198

FLUID PRESSURE REGULATING VALVE

William A. McLean, Rochester, N. Y., assignor to C. Schnackel's Son, Inc., Rochester, N. Y., a corporation of New York Application August 23, 1935, Serial No. 37,538

2 Claims. (Cl. 137—152)

My present invention relates to valves and more particularly to automatically regulated valve structures which produce a desired outlet rate of flow and pressure in a fluid conducting line under varying conditions of inlet or feed pressure. My invention is particularly useful in the handling of liquids of high viscosity, such as lubricating oil lines, and it has for its object to provide a simple, efficient and inexpensive valve of this character that will also be self-cleaning as to deposits of sediment and impurities and which further can be quickly assembled or dissembled. To these and other ends, the invention resides in certain improvements and combinations of parts, all as will be hereinafter more fully described, the novel features being pointed out in the claims at the end of this specification.

In the drawing:

Fig. 1 is a side elevation of a valve structure constructed in accordance with and illustrating one embodiment of my invention;

Fig. 2 is a longitudinal central section showing the movable parts in normal position or in the position which they occupy when the feeding pressure is first applied;

Fig. 3 is a similar view showing the positions of the movable parts when the line is overfed and the supply is automatically cut off;

Fig. 4 is an enlarged cross section on the line 4—4 of Fig. 3, and

Fig. 5 is an enlarged cross section taken on the line 5—5 of Fig. 3.

Similar reference numerals throughout the several views indicate the same parts.

Referring more particularly to the drawing, 1 indicates a threaded nipple to be attached to a feed pipe at 2. Centrally of the nipple is a reduced outlet passage 3 terminating at its inner end in a valve seat 4. A tubular casing or shell 5 is threaded onto the nipple at 6 and its opposite end closed by a plug 7 having a restricted inlet opening 8 therein. The plug is resorted to for convenience in manufacture, though otherwise the casing could be made integral in this respect.

A valve member consisting of a baffle portion 9 and a needle portion 10 is reciprocatably slidable in the casing. It slides upon the relatively enlarged baffle portion which is fitted closely to the bore of the casing and which is provided with peripheral screw threads constituting a tortuous passage through which the oil or other fluid may feed past the valve member to the discharge orifice 8. The reduced portion constituting the needle 9 is adapted to close the valve seat 4 and passage 3, as in Fig. 3, but is surrounded by a coil spring 11 abutting the baffle portion and reacting against the nipple 1 which tends to unseat it and move it to the position of Fig. 2. The operation is as follows:

Starting with the normal position of Fig. 2, the flow of oil through the plug 7 and opening 8, when the supply is released or turned on, traverses the helical passage formed by the baffle threads 9, which enables it to reach the chamber 12 and outlet passage 3, the spring 11 urging the entire valve member toward the source of supply. If, however, the feed and pressure are too great for the outlet 3 to relieve, the pressure will build up behind the valve member and force it along the chamber against the tension of the spring. If the increased pressure is momentary, the needle 10 may not reach the seat 4, but if it is sustained, the needle will seat and shut off the discharge until the pressure diminishes, as shown in Fig. 3. Otherwise, were the nipple 1 attached to the casing, as is intended, of an enclosed filter, the pressure might be so great as to split the casing or place too great a strain on and dislodge the filtering medium. In such systems, the feed line 8 is usually provided with a by-pass (not shown) and when this by-pass goes into operation on the backing up of the feed it relieves the pressure and the valve member returns to the position of Fig. 2. The delivery or outlet pressure through passage 3, as desired, is, of course, regulated by the size of that passage in conjunction with the strength of spring 11.

As the feed is not apt to be continuously uniform in rate and pressure, as, for instance, with the pulsations of the pump, the valve member vibrates in the casing to a greater or less degree in seeking its balance, whereby it tends to dislodge any sediment or foreign matter that might otherwise be deposited between it and the walls of the casing bore within the screw thread groove and the practically knife edge contact of the threads themselves does not permit a fouling at the points of actual contact, which renders the valve self-cleaning. Similarly, the unstable needle 10 does not maintain any particular relationship with the seat 4 for any length of time, so that the latter is self-cleaning also and is not apt to become clogged, as in the case of a positively set needle valve.

Of course, the nipple 1 closing the outlet end of the cylinder may be substituted for by an integral head on the cylinder at that end, similarly provided with a passage 3. After the casing has been bored, plugged and threaded, the assembly consists merely in dropping the spring in the other end, the valve member after it and then screwing in the confining plug 7 or, conversely, with the present embodiment, the plug 7 may be applied first (or this end made integral), the spring dropped in after the valve member and the casing finally screwed on the nipple 1.

With the use of my valve, the desired outlet flow of a thirty pound pressure, for instance, can be uniformly maintained with a feed pressure of several times that.

I claim as my invention:

1. In a pressure regulating valve, the combination with a cylindrical casing having an inlet opening at one end and a restricted discharge opening at the opposite end including a valve seat, of a valve member slidable in the casing and embodying a reduced needle portion adapted to cooperate with the valve seat and a baffle portion fitted to the cylinder and provided with a screw threaded periphery constituting a tortuous fluid passage toward the discharge opening, and an expansion spring interposed between the valve member and the seat to normally hold the valve open.

2. The combination with a cylindrical casing having a restricted discharge opening at one end and an intake opening at the opposite end, the discharge opening being provided with a valve seat and one of the end portions being detachable and replaceable, of a valve member slidable in the casing and embodying a reduced needle portion adapted to cooperate with the valve seat and a baffle portion fitted to the cylinder and provided with a screw threaded periphery constituting a tortuous fluid passage toward the discharge opening, and an expansion spring interposed between the valve member and the seat to normally hold the valve open, the device being adapted for assembly merely by inserting the valve member and spring in proper order from the openable end of the casing and replacing the latter.

WILLIAM A. McLEAN.